United States Patent [19]
Drabarek

[11] Patent Number: 6,064,482
[45] Date of Patent: May 16, 2000

[54] INTERFEROMETRIC MEASURING DEVICE FOR FORM MEASUREMENT ON ROUGH SURFACES

[75] Inventor: Pawel Drabarek, Tiefenbronn, Germany

[73] Assignee: Robert Bosch GmbH, Stuttgart, Germany

[21] Appl. No.: 09/297,695

[22] PCT Filed: Sep. 1, 1998

[86] PCT No.: PCT/DE98/02564

§ 371 Date: Jul. 14, 1999

§ 102(e) Date: Jul. 14, 1999

[87] PCT Pub. No.: WO99/13294

PCT Pub. Date: Mar. 18, 1999

[30] Foreign Application Priority Data

Sep. 5, 1997 [DE] Germany ............... 197 38 900

[51] Int. Cl.[7] ........................................ G01B 9/02
[52] U.S. Cl. ................. 356/359; 356/349; 356/354
[58] Field of Search ........................ 356/349, 359, 356/360, 354

[56] References Cited

U.S. PATENT DOCUMENTS

| | | | |
|---|---|---|---|
| 4,995,726 | 2/1991 | Fujita et al. | 356/349 |
| 5,064,257 | 11/1991 | Shinoda et al. | 356/349 |
| 5,933,237 | 8/1999 | Drabarek | 356/349 |

FOREIGN PATENT DOCUMENTS

| | | |
|---|---|---|
| 108 497 | 5/1984 | European Pat. Off. . |
| 197 21 884 | 6/1998 | Germany . |
| 197 21 842 | 12/1998 | Germany . |
| 2 277 588 | 11/1994 | United Kingdom . |

OTHER PUBLICATIONS

T. Dresel et al., "Three–Dimensional Sensing Of Rough Surfaces By Coherence Radar," Applied Optics, vol. 31, No. 7, Mar. 1, 1992, pp. 919–925.

*Primary Examiner*—Robert H. Kim
*Attorney, Agent, or Firm*—Kenyon & Kenyon

[57] ABSTRACT

An interferometric measuring device measures rough surface profiles on a test object. The measurement is performed using radiation that is coherent over a short distance, a reference beam being periodically modulated in its path of light, i.e., in its propagation time, and being made to interfere with a measuring beam reflected off of the surface of the test object, and the interfered radiation being evaluated with respect to the maximum of the interference contrast. With a simple design, a high measuring accuracy is achieved in that the measuring device has a modulation-interferometer arrangement MI, in which the path of light is altered using acoustooptical deflectors. A compensation device is provided for correcting the spatial decoherence and dispersion. In a downstream demodulation-interferometer arrangement, the measuring beam is interfered by the reference beam and fed to a photodetector.

14 Claims, 2 Drawing Sheets

INTERFEROMETRIC MEASURING DEVICE FOR FORM MEASUREMENT ON ROUGH SURFACES

FIELD OF THE INVENTION

The present invention relates to an interferometric measuring device for measuring rough surface profiles on a test object using a radiation-generating unit, which supplies input radiation that is coherent over a short distance, having a beam-splitter device for producing a reference beam, which is directed at a device having a reflecting element for periodically changing the path of light, and for producing a measuring beam which is directed at the test object, including a hyterodyne element, where the reference beam coming from the test object and the reference beam coming from the device are made to interfere, and including a photodetector which picks up the interfered radiation and feeds it to an evaluation device.

BACKGROUND INFORMATION

A conventional interferometric measuring device is described in the publication, T. Dresel, G. Häusler, H. Venzke "Three-Dimensional Sensing of Rough Surfaces by Coherence Radar", App. Opt., vol. 31, no. 7 of Mar. 1, 1992. This publication proposes using an interferometer having a light source that is coherent over a short distance and a piezoelectrically driven reflector to measure the profile of rough surfaces. In the measuring device, a first beam component, in the form of reference wave, is superimposed on another beam component, in the form of a measuring beam, which is reflected off of a test object. The two light waves have a very short coherence length (a few $\mu$m), so that the interference contrast reaches a maximum when the optical path difference is zero. To change the path of light of the reference wave, the reflecting element is provided in the form of the piezoelectrically driven reflector. The distance to the test object is able to be determined by comparing the position of the piezoelectrically driven reflector to the time of occurrence of the interference maximum. In this context, difficulties can arise when precisely determining the interference maximum and its association to the path of light, since uniquely defining the position of the piezoelectrically driven reflector entails substantial outlay.

SUMMARY OF THE INVENTION

The object of the present invention is to provide an interferometric measuring device which will enable the design to be simplified and a high measuring accuracy to be achieved.

A modulation-interferometer arrangement is provided, whose design is such that, using a first beam splitter of the beam-splitter device, in addition to the reference beam, a second beam component is also formed. The device for altering the path of light is a parallel-shifting arrangement disposed at least in the path of rays of the reference beam, and the reflecting element is a retro grating. Disposed in the path of rays of the reference beam upstream from the parallel-shifting arrangement, is a compensation grating, where the reference beam is diffracted both before as well as after passing through the parallel-shifting arrangement. Arranged in the path of rays of the second beam component is a pair identical to that in the path of rays of the reference beam, including an additional compensation grating and an additional retro grating arranged downstream therefrom, the optical path lengths of the thus formed two arms for the reference beam and for the second beam component of the modulation-interferometer arrangement exhibiting a difference greater than the coherence length. The reference beam fed back via the compensation grating, and the second beam component fed back via the additional compensation grating, are joined to form an intermediate beam. A demodulation-interferometer arrangement is provided, whose design is such that the intermediate beam is split into two further arms of the demodulation-interferometer arrangement using an additional beam splitter, the one arm terminating in a reflector, and the other arm terminating in the test object surface, and the two other arms exhibiting the same path difference as the arms of the modulation-interferometer arrangement the beams redirected by (reflected off) the reflector and the test object surface are made to interfere at the superimposing hyterodyne element.

By using the parallel-shifting arrangement and the reflecting element conceived as a retro grating, the path of light is changed without using mechanically driven parts, as described German Patent Application No. 197 21 842.3. Placing the compensation grating in the path of rays of the reference beam, makes it possible to compensate for the spatial decoherence of the wave fronts and for the angular dispersion produced by the different wavelengths in reaching the short coherence length, as indicated in German Patent Application No. 197 21 884.9. Merely using the compensation grating in the path of rays of the reference beam causes a further dispersion, which increases with the distance between the retro grating and the compensation grating. By using the second arm configured in the modulation-interferometer arrangement, including a retro grating and a compensation grating identical to those in the arm of the reference beam, and by using the indicated demodulation-interferometer arrangement design, one is able to compensate for this additional dispersion and additionally achieve a separation between the relatively large structure of the modulation-interferometer arrangement and the relatively compact demodulation-interferometer arrangement, which is capable of being miniaturized as a measuring probe, so that the measuring device is also easy to manipulate.

To achieve a simple design and a simple method for driving the measuring device, it is beneficial that the parallel-shifting arrangement have an acoustooptical deflector device arranged in the path of rays, and that the deflector device be driven so as to be frequency-modulated, and arranged with respect to the incident reference beam, as well as the reflection grating in such a way that the reference beam, conducted to the hyterodyne element, experiences a change in its path of light resulting from its deflection in the deflector device. Thus, the path of light can be simply changed in a precisely defined manner, and the interference maximum can be uniquely defined as a function of the path of light.

If provision is made for the grating constant of the compensation grating and of the second compensation grating to be twice as great as the grating constant of the retro grating, i.e., of the additional retro grating, then the angular dispersion and the spatial decoherence of the wave fronts are eliminated quite effectively.

To compensate for the spatial decoherence, it is also advantageous for the compensation grating and the retro grating, as well as the additional compensation grating and the additional retro grating to be disposed in parallel to one another. The design layout is further simplified by designing the compensation grating to be reflecting, in that a reflector is arranged in the path of rays of the reference beam and of the second beam component, between the first beam splitter and the compensation gratings, in each case, the reflector directing the reference beam or the second beam component on its path toward the corresponding compensation grating and, on its return path, toward the beam splitter, which produces the intermediate beam, and in that the additional beam splitter simultaneously forms the hyterodyne element.

For the sake of ease of handling, the demodulation-interferometer arrangement is advantageously coupled via an optical waveguide to the modulation-interferometer arrangement.

A surface-area evaluation is rendered possible by widening the intermediate beam at be entry of the demodulation-interferometer arrangement using a telescopic arrangement, to form a wide beam of light, and by designing the photodetector as a CCD camera.

For measured-value acquisition and enhancement of measuring accuracy, a design is provided for a conventional hyterodyne-interferometric evaluation, a device for shifting frequency between the interfering beams being provided.

One advantageous design of a simple measuring arrangement provides for configuring the parallel-shifting arrangement only in the arm of the modulation-interferometer arrangement that carries the reference beam.

To also have a compact type of construction for the modulation-interferometer arrangement, a further advantageous design provides for configuring the parallel-shifting arrangement in both arms of the modulation-interferometer arrangement in such a way that the arrangement is traversed both on the outgoing path as well as on the return path by the reference beam and by the second beam component. This design is further simplified by tilting the retro grating for the reference beam and the additional retro grating for the second beam component, so as to allow the simultaneous displacement of the reference beam and of the second beam component to effect an opposite modulation of their propagation time, and by arranging the two retro gratings in such a way that the optical path difference results for the reference beam and the second beam component.

In this context, a favorable arrangement for a hyterodyne-interferometric evaluation is achieved by arranging an acoustooptical modulator between the two compensation gratings and the parallel-shifting arrangement, and by having associated modulator-drivers drive the acoustooptical modulators with a slightly different frequency, to produce a frequency shift in the reference beam and in the second beam component. In the process, the two acoustooptical modulators compensate one another. Another option is to provide only one acoustooptical modulator in one of the two arms of the modulation-interferometer arrangement on the side of the parallel-shifting arrangement facing away from the retro gratings.

With respect to the mode of operation of the hyterodyne-interferometric method per se, reference is made to the relevant literature.

DETAILED DESCRIPTION

Figure 1:
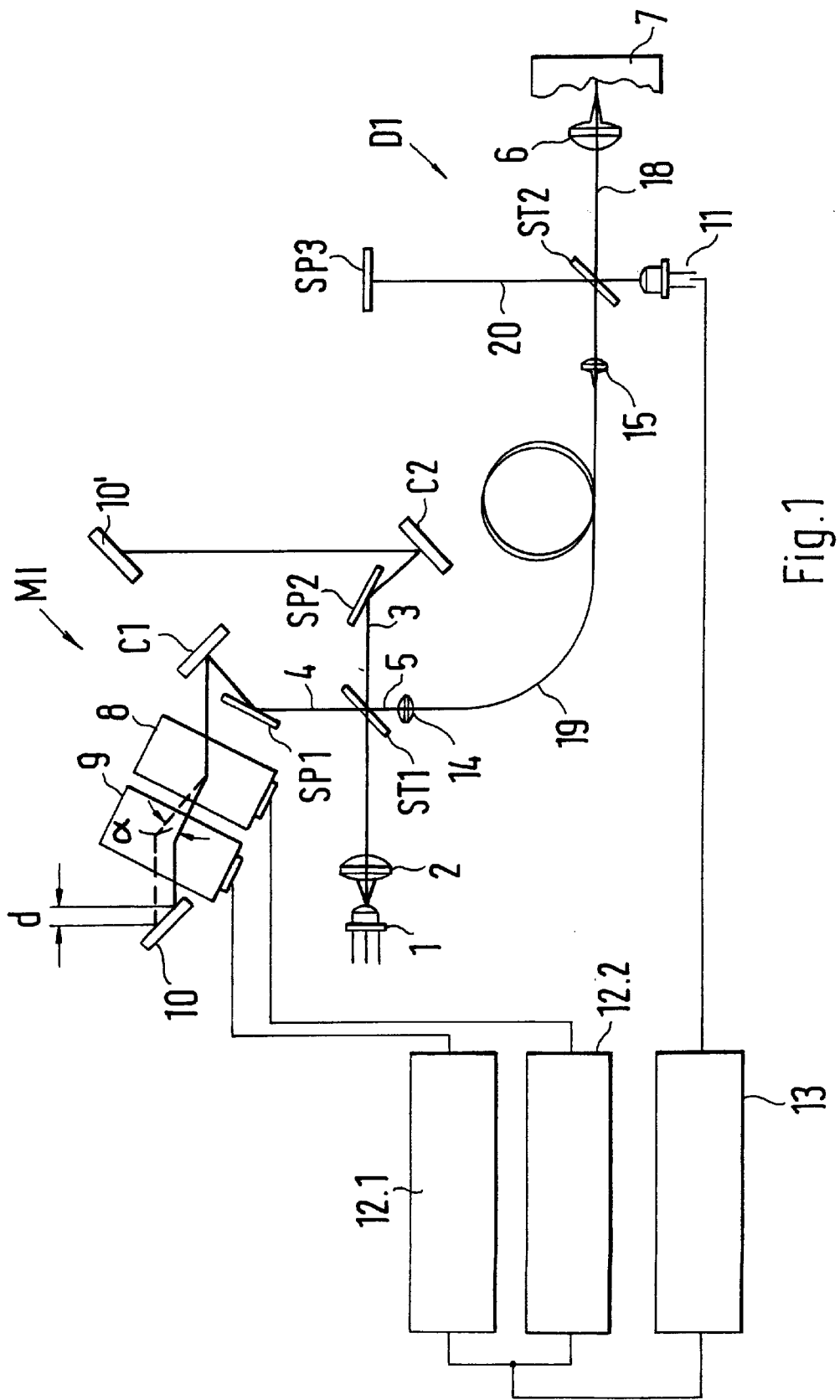
FIG. 1 shows a first exemplary embodiment of an interferometric measuring device having a modulation-interferometer arrangement and a downstream demodulation-interferometer arrangement.

As an important component, the interferometric measuring device shown in FIG. 1 has a modulation-interferometer arrangement MI, in which a temporal (time related) path difference of a reference beam 4 is generated, and as another important component has a demodulation-interferometer arrangement DI, in which a measuring beam 18 reflected off of the surface of a test object 7 is made to interfere with reference beam 4 or with components of the same, and the interfered beam is supplied to a photodetector 11. Modulation-interferometer arrangement MI is supplied by a light source 1 via a collimator 2 with an input beam, which is split by a first beam splitter ST1 into reference beam 4 and a second beam component 3. Reference beam 4 and second beam component 3 pass through two associated arms of modulation-interferometer arrangement MI, the arm of reference beam 4 having in a sequential arrangement, a reflector SP1, a compensation grating C1, a parallel-shifting arrangement of a first and a second acoustooptical deflector 8,9, as well as a retro grating 10.

The two acoustooptical deflectors 8,9 are driven so as to be frequency-modulated by deflector drivers 12.1, 12.2. The frequency modulation causes the deflecting angle of reference beam 4 in first acoustooptical deflector 8 to to be varied by an angle α. In the second acoustooptical deflector 9, reference beam 4 is subsequently re-deflected in the direction in which it impinges upon first acoustooptical deflector 8. Thus, a parallel shift results for reference beam 4 emerging from second acoustooptical deflector 9, the reference beam subsequently illuminating retro grating 10. Retro grating 10 is tilted at a defined angle, so that reference beam 4 returns, independently of the parallel shift, via the two acoustooptical deflectors 8,9, compensation grating C1, and reflector SP1, to first beam splitter ST1.

Disposed one after another sequentially in the second arm of modulation-interferometer arrangement MI, in the path of rays of second beam component 3, are an additional reflector SP2, an additional compensation grating C2, and, finally, an additional retro grating 10'. Compensation grating C1 and the other compensation grating C2, on the one hand, as well as retro grating 10 and the other retro grating 10', on the other hand, are identical. The two arms of modulation-interferometer arrangement MI are dissimilar with respect to their optical lengths, the difference being substantially greater than the coherence length of light source 1 (for example a few mm).

Compensation grating C1 compensates to a certain extent for the spatial decoherence of the wave fronts and for the angular dispersion produced by the different wavelengths of the light required for the short coherence length. The additional dispersion produced in the process, however, which increases substantially with the distance between retro grating 10 and compensation grating C1, is compensated by the corresponding grating of the other arm of modulation interferometer arrangement MI. Since the optical lengths of the two arms are dissimilar, returning reference beam 4 and second beam component 3 do not interfere with one another at the output of modulation-interferometer arrangement MI.

After being merged at first beam splitter ST1, reference beam 4 and second beam component 3 are directed as an intermediate beam 5 via a lens 14 into an optical waveguide 19, as whose output demodulation-interferometer arrangement DI is connected via another lens 15. Configured, in turn, in demodulation-interferometer arrangement DI behind a second beam splitter ST2, are two arms, into which the two beam components formed from intermediate beam 5 are directed. The one beam component impinges as a measuring beam 18 via a focusing lens 6 on the surface of test object 7, and is re-reflected there at the second beam splitter. The other beam component impinges upon a third reflector SP3, where it is likewise redirected to the second beam splitter ST2. The two arms of demodulation-interferometer arrangement DI, which is designed in the manner of the modulation interferometer arrangement MI, for example, as a Michalson interferometer, have the same optical path difference as the arms of modulation-interferometer arrangement MI. For this reason, the two beam components coinciding at the second beam splitter interfere in the form of measuring beam 18 and the other beam component 20. The interfered beam is supplied to photodetector 11, which detects the signal maximum of the interference contrast resulting from the short coherence length of the input beam supplied by a light source 1, and feeds it to an evaluation circuit 13. By comparing the point in time when the signal maximum occurs to the momentary frequency of the deflector driver, the distance to test object 7 and, thus, the surface profile is able to be determined, as described, for example in German Patent Application No. 197 21 842.

In this context, the compensation measures described above make it possible to use light sources having a shorter coherence length, enabling one to obtain a sharper signal maximum, or, given a same coherence length, an improved contrast.

In another embodiment, a telescope, used to widen the incident intermediate beam 5, is located at the input of demodulation-interferometer arrangement DI, to enable surface measurements to be made. In this arrangement, photodetector 11 is designed as a CCD camera.

Figure 2:
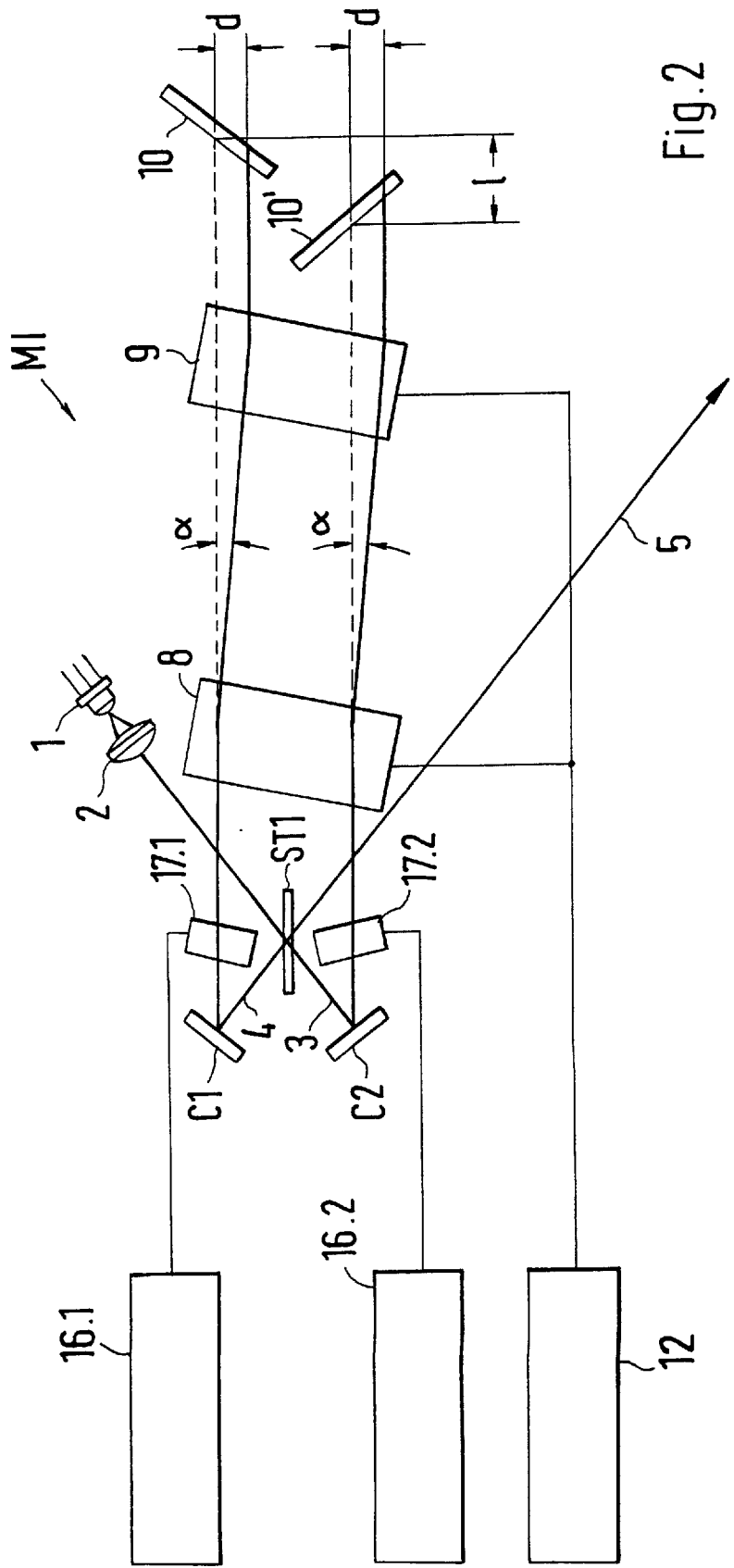
FIG. 2 shows a second exemplary embodiment of a modulation-interferometer arrangement of the measuring device.

FIG. 2 depicts a second exemplary embodiment, modulation-interferometer arrangement MI having a compact design, and the amplitude of the propagation-time modulation being doubled.

In the arrangement according to FIG. 2, the light from light source 1 that is coherent for a short distance, is collimated by collimator 2 and split by first beam splitter ST1 into two beam components, which correspond to reference beam 4 and second beam component 3, in accordance with FIG. 1. The two beam components 3,4 are diffracted separately in the two compensation gratings C1 and C2 and pass through two acoustooptical modulators 17.1 and 17.2. The acoustooptical modulators 17.1 and 17.2 are driven by associated modulator drivers 16.1,16.2, with slightly different frequencies (e.g. 500 kHz), a frequency shifting of both beam components being forced thereby for purposes of hyterodyne-interferometric evaluation. Another specific embodiment provides for only one of the beam components 3,4 to propagate through an acoustooptical modulator. Both beam components 3,4 then pass as parallel-shifted beam components through the two acoustooptical deflectors 8,9. In the process, the two acoustooptical deflectors 8,9 are controlled by a deflector driver 12, using an identical signal, and the two beam components 3,4 are each shifted in parallel, in phase with the control signal, and directed at associated retro gratings 10, 10', which diffract them. The two retro gratings are tipped in such a way that the simultaneous linear shifting of the beam components by the acoustooptical deflectors 8,9 effects an opposite modulation of the propagation time. Moreover, the retro gratings 10, 10' are arranged so as to produce the optical path difference, in accordance with the exemplary embodiment of FIG. 1, for both beam components 3,4. In the process, the two beam components 3,4, after returning via compensation gratings C1, C2, are superimposed in first beam splitter ST1, where they do not interfere as a result of the path difference, and are directed as an intermediate beam 5 into the demodulation-interferometer arrangement, preferably designed as a measuring probe.

Here as well, compensation grating C1 and associated retro grating 10, on the one hand, and the other compensation grating C2 and the other retro grating 10',on the other hand, are arranged in parallel with one another, the two pairs being tipped, however, oppositely to one another, but at the same angle with respect to the emergent or incident, parallel beam components 3,4.

The described measures yield a high measuring precision without the use of mechanically driven parts, the design being extremely compact, particularly with respect to the measuring probe to be manipulated, as it merely contains the components of the demodulation-interferometer arrangement.

What is claimed is:

1. An interferometric measuring device for measuring a rough surface profile on a test object, comprising:

a radiation-generating unit providing an input radiation which is coherent over a short distance;

a parallel-shifting arrangement including a reflecting element which has a retro grating, the parallel-shifting arrangement periodically changing a path of a light;

an evaluation device;

a beam-splitter device producing a reference beam and a measuring beam, the reference beam being directed at the parallel-shifting arrangement, the measuring beam being directed at the test object, the beam-splitter device including a beam splitter element, a heterodyne element and a photodetector, wherein the beam-splitter device provides an interference between the reference beam from the test object and the reference beam from the parallel-shifting arrangement, the parallel-shifting arrangement being situated at least in a path of first rays of the reference beam, and wherein the reference beam is diffracted before passing through the parallel-shifting arrangement and after passing through the parallel-shifting arrangement, the photodetector detecting a radiation of the interference and transmitting the radiation to the evaluation device;

a modulation-interferometer arrangement generating the reference beam and a further beam component using the beam-splitter device;

a first compensation grating situated in the path of the first rays upstream from the parallel-shifting arrangement;

a second compensation grating situated in a path of second rays of the further beam component;

a further retro grating situated in the path of the second rays downstream from the second compensation grating, the second compensation grating and the further retro grating being identical to the first compensation grating and the retro grating, respectively, wherein a first path difference between a first path optical path length of the reference beam and a second path optical path length of the further beam component is greater than a predetermined coherence length, wherein the first compensation grating feeds back the reference beam, and the second compensation grating feeds back the further beam component, and wherein the reference beam and the further beam component are joined to form an intermediate beam; and a demodulation-interferometer arrangement splitting the intermediate beam into a first arm and a second arm using the heterodyne element, the first arm terminating in a reflector, the second arm terminating in a surface of the test object, wherein the first path difference is equal to a second path difference between a path of the first arm and a path of the second arm, and wherein the reflector and the surface of the test object redirect beams to interfere at the heterodyne element.

2. The measuring device according to claim 1, wherein the parallel-shifting arrangement includes an acoustooptical deflector device which is arranged in the path of the first rays, the deflector device being driven into a frequency-modulated state, the deflector device being arranged, with respect to the incident reference beam and the reflection grating, such that a change in the path of a light of the reference beam results from a deflection of the reference beam in the deflector device.

3. The measuring device according to claim 2, wherein a grating constant of the first compensation grating and of the second compensation grating is larger by a factor of two than a further grating constant of the further retro grating.

4. The measuring device according to claim 2, wherein the first compensation grating, the retro grating, the second compensation grating and the further retro grating are disposed parallel to one another.

5. The measuring device according to claim 4, wherein at least one of the first and second compensation gratings reflects by arranging a reflector in the path of the first rays of the reference beam between the beam splitter device and the first and second compensation gratings, the reflector directing one of the reference beam and the further beam component on a path toward a corresponding one of the first and second compensation gratings and toward the beam-splitter device on a return path which generates the intermediate beam.

6. The measuring device according to claim 1, wherein an additional beam splitter is simultaneously formed by the hyterodyne element.

7. The measuring device according to claim 1, wherein the demodulation-interferometer arrangement is coupled to the modulation-interferometer arrangement via an optical waveguide.

8. The measuring device according to claim 1, wherein the intermediate beam is widened by a telescope arrangement to form a broad beam of light, the intermediate beam being provided at an input of the demodulation-interferometer arrangement, the photodetector including a CCD camera which detects the broad beam.

9. The measuring device according to claim 8, further comprising:

a further device shifting a frequency between the interfering beams for a hyterodyne-interferometric evaluation.

10. The measuring device according to claim 9, wherein the parallel-shifting arrangement is provided only in a part arm of the first and second arms which carries the reference beam.

11. The measuring device according to claim 1, wherein the parallel-shifting arrangement is arranged in the first and second arms to traverse the modulation-interferometer arrangement on an outgoing path and a return path by the reference beam and by the further beam component.

12. The measuring device according to claim 11, wherein the retro grating and the further retro grating are tilted to allow a simultaneous displacement of the reference beam and the further beam component for effecting an opposite modulation of respective propagation times of the reference beam and the further beam component, the retro grating and the further retro grating being arranged such that the first path difference for the reference beam and the further beam component is determined.

13. The measuring device according to claim 11, further comprising:

an acoustooptical modulator arranged between the first and second compensation gratings and the parallel-shifting arrangement; and a modulator-driver driving the acoustooptical modulator with a slightly different frequency to produce a frequency shift in the reference beam and the further beam component.

14. The measuring device according to claim 11, further comprising:

one acoustooptical modulator provided in one of the first and second arms on a side of the parallel-shifting arrangement facing away from the retro grating and the further retro grating.

* * * * *